United States Patent
Koester

(10) Patent No.: US 6,216,995 B1
(45) Date of Patent: Apr. 17, 2001

(54) SOLENOID ACTIVATED MANUAL ADJUSTER

(75) Inventor: Daniel J. Koester, Holland, MI (US)

(73) Assignee: Johnson Contools Technology Company, Plymouth, WI (US)

( * ) Notice: Subject to any disclaimer, the term of this patent is extended or adjusted under 35 U.S.C. 154(b) by 0 days.

(21) Appl. No.: 09/176,631

(22) Filed: Oct. 22, 1998

(51) Int. Cl.$^7$ ..................................................... B60N 2/12
(52) U.S. Cl. ........................................ 248/429; 297/344.1
(58) Field of Search ................................... 248/429, 424, 248/419; 297/344.1, 344.17

(56) References Cited

U.S. PATENT DOCUMENTS

| | | | |
|---|---|---|---|
| 2,579,599 | * 12/1951 | Moroney | 297/344.1 |
| 3,922,029 | * 11/1975 | Urai | 248/429 |
| 5,188,329 | * 2/1993 | Takahara | 297/344.1 |
| 5,192,045 | * 3/1993 | Yamada et al. | 297/344.1 |
| 5,348,373 | 9/1994 | Stiennon | 297/344.1 |
| 5,547,159 | * 8/1996 | Treichl et al. | 248/429 |
| 5,564,315 | * 10/1996 | Schüler et al. | 248/429 |
| 5,584,460 | * 12/1996 | Ropp | 297/244.1 |
| 5,613,733 | * 3/1997 | Miller, Sr. et al. | 297/344.1 |
| 5,800,015 | * 9/1998 | Tsuchiya et al. | 297/344.1 |
| 5,813,726 | * 9/1998 | Husted | 248/429 |
| 5,848,775 | * 12/1998 | Isomura et al. | 248/429 |
| 6,036,267 | * 3/2000 | Downey et al. | 248/429 |

FOREIGN PATENT DOCUMENTS

| | | | |
|---|---|---|---|
| 2729770 | * 1/1979 | (DE) . | |
| 2844647 | * 4/1980 | (DE) | 248/429 |
| 61-253234 | 11/1986 | (JP) . | |

* cited by examiner

Primary Examiner—Ramon O. Ramirez
Assistant Examiner—Jon Szumny
(74) Attorney, Agent, or Firm—Foley & Lardner

(57) ABSTRACT

An adjuster for adjusting the position of a vehicle component relative to a vehicle body having a fixed rail and a slide rail movable relative to the fixed rail. The adjuster includes a latch in which a movable plunger from an electromechanical device such as a solenoid is used as a latch pin and is seated into an aperture in a latch plate to hold the slide rail in position relative to the fixed rail.

6 Claims, 1 Drawing Sheet

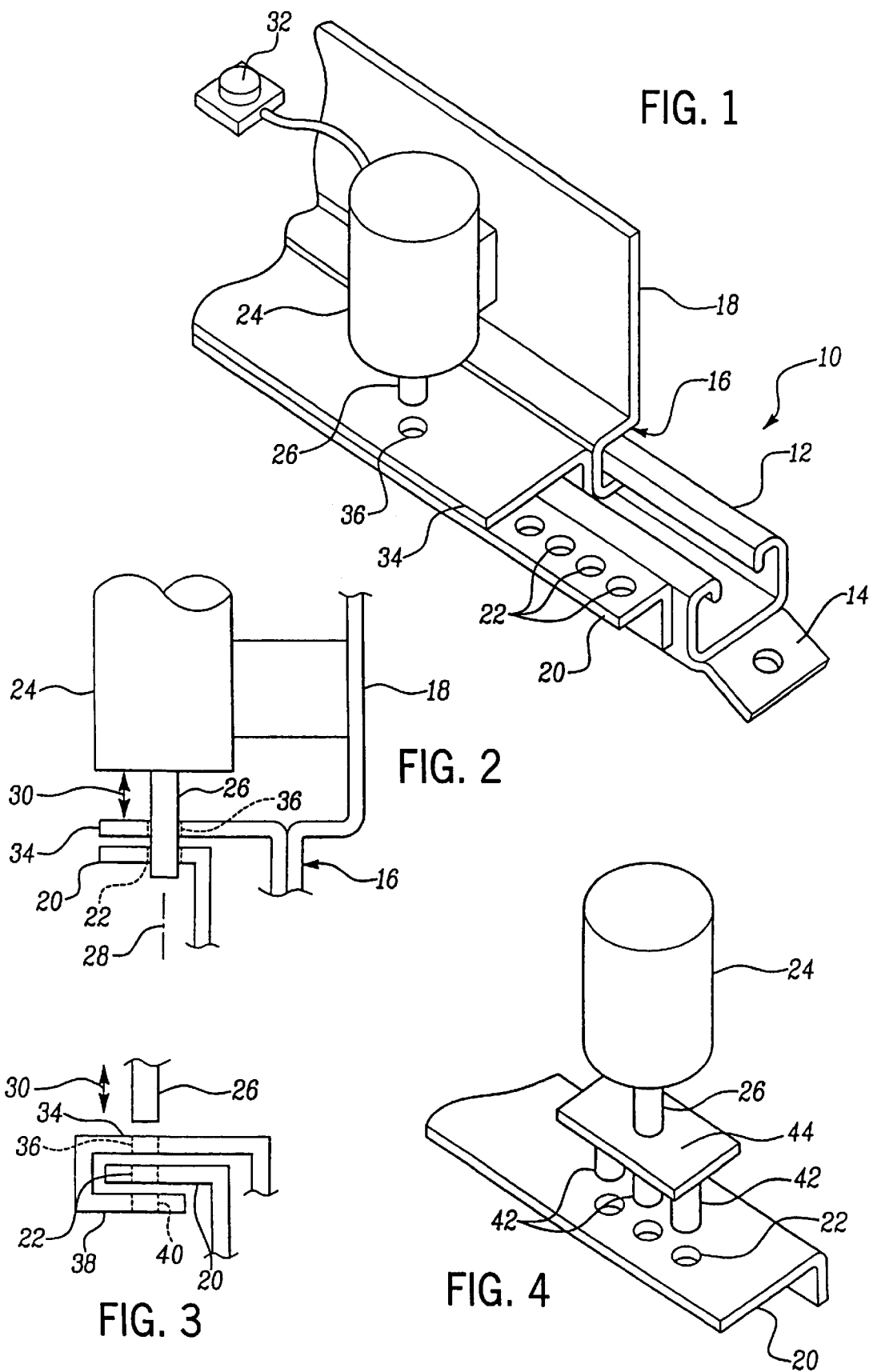

SOLENOID ACTIVATED MANUAL ADJUSTER

BACKGROUND OF THE INVENTION

The present invention relates to a manual adjuster for adjusting the position of a vehicle component relative to a vehicle body and in particular, to an adjuster having a solenoid actuated latch mechanism for holding the adjuster in position.

Vehicle seat assemblies are typically provided with a fore and aft adjuster that enables the seat assembly to be moved fore and aft within a motor vehicle. Such adjustment capability is necessary to enable vehicle operators of various sizes to be seated comfortably and safely within the motor vehicle. The adjuster is either manually operated, having a mechanical mechanism for latching the seat assembly in place and a mechanical release to free the adjuster to enable adjustment, or the adjuster is power operated, using one or more drive motors to move the seat assembly within the vehicle. Power adjusters, by virtue of the power operation can provide a control for operating the adjuster at a location distant from the mechanism itself and connected thereto by an electrical wire. As a result, the control can be placed at a convenient and easy to reach location. However, with a manual adjuster, it is necessary to provide a release mechanism that is in close proximity to the latch due to the mechanical coupling between the latch and its release control.

One manner of providing a manual adjustment with an easily reached control is to use a solenoid to release the latch. Such a device is shown in U.S. Pat. No. 5,348,373. In that patent, a solenoid is mechanically coupled to the latch mechanism to move the latch to a release position.

The present invention seeks to provide a simplified solenoid operated latch mechanism to reduce the number of components and the complexity of the latch release mechanism.

The mechanism of the present invention achieves this objective by utilizing the movable plunger of the solenoid itself as the latch pin that seats in an aperture in a latch plate to latch the adjuster in a given position. As a result, the solenoid plunger is not used to move the latch mechanism but becomes part of the latch mechanism itself.

While adjusters are well known for vehicle seat assemblies, the adjuster of the present invention is not limited to use with a seat but can be used with any movable vehicle component. Possible applications other than seat assemblies, include a floor console that is movable fore and aft within a vehicle and a trunk storage system having a sliding tray that moves in and out of a vehicle. Other moving devices can utilize the adjuster as well.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of the adjuster of the present invention;

FIG. 2 is a front elevational view of the adjuster shown in FIG. 1;

FIG. 3 is a front view showing an alternative embodiment of the adjuster of the present invention; and FIG. 4 is a perspective view showing yet another alternative view of the adjuster.

DETAILED DESCRIPTION OF THE PREFERRED EMBODIMENT

The adjuster of the present invention is shown in FIG. 1 and designated generally at 10. The adjuster 10 includes a fixed rail 12 which includes feet 14, one of which is shown, for attaching the fixed rail to the body of a motor vehicle so that the fixed rail remains in a given position relative to the vehicle body. The fixed rail can be mounted to the vehicle body at any location, including the floor, sill, tunnel, side wall or roof, if desired. A slide rail 16 is mounted to the fixed rail for sliding movement fore and aft relative to the fixed rail along the longitudinal length of the fixed rail. As a result, the sliding rail is movable relative to the vehicle body to which the fixed rail 12 is attached. The slide rail 16 includes a riser 18 to which a seat assembly or other vehicle component can be attached. Depending upon the given application, the riser can take any of a variety of different forms and configurations.

The fixed rail includes a latch plate 20 having an array of aligned apertures 22 extending therethrough. The array of apertures 22 is aligned along the longitudinal length of the fixed and sliding rails, in the direction of movement of the slide rail relative to the fixed rail.

An electromechanical device, such as a solenoid 24, is attached to the slide rail 16. In FIG. 1 it is shown attached to the riser 18. The solenoid 24 is used to move a plunger 26 back and forth along a plunger axis 28 as shown by the arrow 30. The solenoid typically includes a spring to bias the plunger in one direction and an electromagnet to move the plunger in the opposite direction in opposition to the spring.

The plunger 26 will be biased downward by the spring toward the latch plate 20. When aligned with an aperture 22, the plunger will extend through the aperture 22. In this position the adjuster is latched, the slide rail 16 cannot move longitudinally along the fixed rail 12. Typically, the plunger will be spring biased to the latched position. Activation of the solenoid by a switch 32 causes the plunger to be withdrawn from the aperture 22 thereby freeing the slide rail for movement along the fixed rail 12.

To avoid transferring the latch load on the plunger through the solenoid to the slide rail 16, the slide rail can be equipped with a slide plate 34 having an aperture 36 which is aligned with the axis 28 of plunger 26. With the plunger 26 extending through both the slide plate 34 and the latch plate 20, the latch load required to hold the slide rail in place does not travel through the solenoid and the attachment of the solenoid to the slide rail. Rather, the load path is directly from the plunger 26 to the slide plate 34.

In an alternative embodiment shown in FIG. 3, the slide plate 34 wraps around the latch plate 20 and forms a lower portion 38, also having an aperture 40 which is aligned with the aperture 36 and axis of the axis 28 of the plunger. When latched the plunger extends through both the upper and lower portions of the slide plate. This reduces the bending load applied to the plunger.

With reference to FIG. 4, another embodiment of the adjuster is shown. In this embodiment, multiple latch pins 42 are connected to the solenoid plunger 26 by a connector bar 44. The multiple latch pins 42 extend through multiple apertures 22 in the latch plate 20, providing greater retention strength to the latch mechanism. The latch pins 42 move along with the plunger 26 in a direction parallel to the plunger axis 28. The multiple latch pins 42 can be utilized with a slide plate 34 having an aperture aligned with each of the latch pins 42.

With multiple latch pins, it is possible, and perhaps preferable, to have pins which are movable relative to the connector bar 44 and spring biased to positions extending therefrom. Such spring biased latch pins can be utilized along with variable spacing of the apertures 22 in the latch plate. For a given position of the slide rail relative to the fixed rail, one or more of the apertures 22 will align with the pins 42 but not all of the pins will be aligned with an aperture. Such a mechanism can be used to provide finer adjustment capabilities to the adjuster. As a result, there is less travel of the slide rail between adjacent positions.

While the invention has been described with the solenoid mounted to the slide rail and the latch plate having an array of apertures mounted to the fixed rail, it will be appreciated that the solenoid can be mounted to the fixed rail while the latch plate is mounted to the slide rail if desired.

The invention is not limited to components that are linearly movable relative to one another. The invention can also be used with components that rotate relative to one another. In such an application, the array of apertures in the latch plate will be arranged in an arcuate path concentric about the axis of rotation of the two components.

The adjuster of the present invention utilizes the solenoid plunger, or plural pins movable parallel to the plunger axis, to form the latch pin that seats in an aperture in the latch plate. This reduces the number of components required in the latch mechanism as compared to the prior designs.

It is to be understood that the invention is not limited to the exact construction illustrated and described above, but that various changes and modifications may be made without departing from the spirit and scope of the invention as defined in the following claims.

What is claimed is:

1. An adjuster for adjusting the position of a vehicle component comprising:
   first and second members movable relative to one another and adapted to be mounted to a vehicle body;
   a latch for holding said first and second members in place relative to one another, said latch including a first latch portion with an array of apertures therethrough attached to said first member and an electromechanical actuator mounted to said second member, said electromechanical actuator having a plunger extending therefrom and being movable along a plunger axis between a latched position and a release position;
   a second latch portion with an aperture therethrough mounted to said second member along with said electromechanical actuator, said second latch portion being disposed adjacent said first latch portion of said first member and being moveable along with said second member to positions in which said aperture of said second latch portion aligns with one of said apertures in said first latch portion;
   a third latch portion mounted to said second member along with said electromechanical actuator and said second latch portion with an aperture therethrough aligned with said aperture of said second latch portion, said third latch portion being disposed adjacent said first latch portion of said first member and opposite from said second latch portion; and
   said plunger extends through said aperture in both said second and third latch portions and through said one aperture in said first latch portion of said first member when said plunger is in said latched position whereby said second member is held in place relative to said first member, said plunger is withdrawn from all of said apertures when in its release position whereby said second member is free to move relative to said first member.

2. The adjuster as defined by claim 1 wherein said first member is adapted to be mounted to the vehicle body in a stationary manner.

3. The adjuster as defined by claim 1 wherein said first and second members are elongated rails which move longitudinally relative to one another.

4. The adjuster of claim 1 wherein said electromechanical actuator is a solenoid.

5. An adjuster for adjusting a vehicle component position relative to a vehicle body comprising:
   an elongated fixed rail adapted to be mounted to a vehicle body in a stationary manner;
   an elongated slide rail adapted to be fixed to a vehicle component and to be mounted to said fixed rail for movement relative to said fixed rail and the vehicle body along a longitudinal length of said fixed rail whereby the vehicle component can be adjusted in position relative to the vehicle body;
   a latch for holding said slide rail in place relative to said fixed rail, said latch including a first latch portion on one of said fixed and slide rails having an array of apertures therethrough;
   an electromechanical actuator mounted to the other of said fixed and slide rails and having a plunger extending therefrom and moveable along a plunger axis between a latched position and a release position;
   said other of said fixed and slide rails Including a second latch portion with an aperture therethrough, said second latch portion being disposed adjacent said first latch portion and moveable relative to said first latch portion to positions in which said apertures of said second latch portion align with one of said apertures in said first latch portion;
   wherein said other of said fixed and slide rails includes a third latch portion with an aperture therethrough, said third latch portion being disposed adjacent said first latch portion opposite from said second latch portion and moveable along with said other of said fixed and slide rails to positions in which said aperture of said second latch portion and said aperture in said third latch portion align with one of said apertures in said first latch portion; and
   said plunger extending through said aperture in both said second and third latch portions and through said one aperture in said first latch portion when said plunger is in said latched position whereby said fixed rail and said slide rail are held in place relative to each other and said plunger is withdrawn from all of said apertures when said plunger is in its release position, whereby said slide rail is free to move relative to said fixed rail and the vehicle body.

6. The adjuster of claim 5 wherein said first latch portion is part of said fixed rail and said electromechanical actuator is mounted to said slide rail.

* * * * *